United States Patent [19]

Verschaeren

[11] Patent Number: 5,491,032
[45] Date of Patent: Feb. 13, 1996

[54] MASKING FILM

[75] Inventor: Patrick C. M. Verschaeren, Brecht, Belgium

[73] Assignee: Hyplast N.V., Hoogstraten, Belgium

[21] Appl. No.: 197,160

[22] Filed: Feb. 16, 1994

[30] Foreign Application Priority Data

Feb. 23, 1993 [NL] Netherlands ............................ 9300330

[51] Int. Cl.[6] ..................................................... B32B 15/00
[52] U.S. Cl. ........................... 428/461; 428/515; 428/517; 428/77
[58] Field of Search .................................... 428/500, 517, 428/515

[56] References Cited

U.S. PATENT DOCUMENTS 4,550,141  10/1985  Hoh ........................................ 525/196
5,096,761   3/1992  Roberts .................................... 428/77
5,100,709   3/1992  Barger et al. ............................ 428/41

Primary Examiner—Edith Buffalow

[57] ABSTRACT

The invention relates to a masking film consisting of one or more layers, to use when selectively lacquering parts of a surface, in particular of cars, with a polar outer layer. According to the invention the polar outer layer is usually a layer made from a polymer or copolymer or terpolymer, which is of itself permanently polar, without any pre- or post-treatment.

Preferably the polar outer layer is an ionomer layer, formed from the reaction product of an acidic copolymer or an acidic terpolymer and a metal salt, and preferably from the reaction product of ethylene acrylic acid or ethylene methacrylic acid on the one hand and a sodium or zinc salt on the other hand.

5 Claims, 1 Drawing Sheet

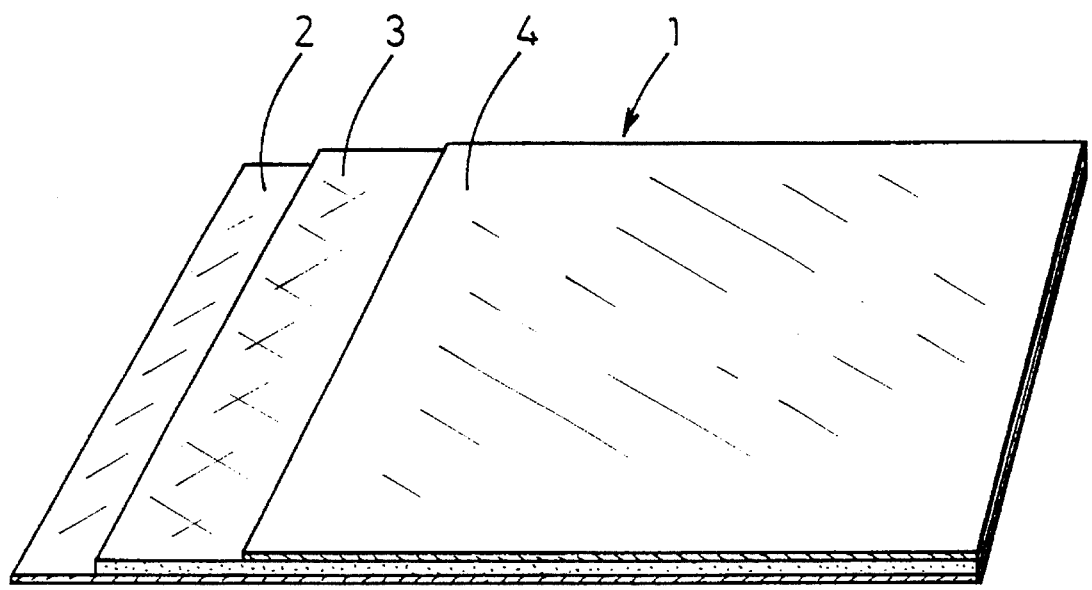

MASKING FILM

BACKGROUND OF THE INVENTION

The invention relates to a masking film consisting of one or more layers, to use when selectively lacquering surface parts, in particular of cars, with a polar outer layer.

BRIEF DESCRIPTION OF THE RELATED ART

Traditionally, when lacquering surface parts, in particular of cars, one used paper because of its absorbing capacity. The surface part covered with paper is masked, that is to say, no paint or lacquer comes onto that part of the sheet-metal. However, the disadvantage of using paper is that it has to be very strong and of high quality. If paper is too thin, the paint or lacquer, usually applied by spraying, can penetrate to the parts of the sheet-metal which are supposed to be masked or protected. Because of these high quality requirements the costs for the paper are relatively high. Another disadvantage attached to the use of paper is the fact that paper saturated with lacquer cannot be reused for paper production, as the paper is saturated with chemicals from the lacquer. Therefore the paper with lacquer and all must be thrown away, which is a burden on the environment.

Later on plastic foils were used, which in the beginning were mainly used to keep parts of the bodywork dust free and free of lacquer. Such foils are not suitable as masking film when lacquering as such, because when removing the foil, the lacquer which has come onto the foil will flake off, and the flakes will land on the newly lacquered part, necessitating post-treatment.

In order to avoid the disadvantage of the flaking of the lacquer layer which has come onto the foil, it was suggested in the European patent specification EP 277 552 to subject the masking film before use to a corona treatment, so that the lacquer adheres to the foil to the extent that flaking is avoided. A suitable corona pre-treatment has an effect on the surface tension in the sense that the printing inks and lacquer paints adhere very well. In such a treatment of a crystalline plastic foil without lubricant, for instance high density polyethene (HDPE), a surface tension of 45 dyn/cm can be achieved. It has been shown that with such a treatment the foil could be used for masking purposes for several months.

However, the described prior art has the disadvantage that the foil, before application as masking film, requires a corona charge, which treatment involves extra and costly corona equipment.

Another disadvantage of the thus treated foil is that, as mentioned before, the favourable effect of the treatment disappears after some time and even after a few months does not possess sufficient adhesion to retain the lacquer which was sprayed on, resulting in flaking, which is undesirable because the flakes then land on the newly sprayed bodywork parts which then require post-treatment.

The object of the invention is now to provide a masking film which does not have the disadvantages mentioned above, making it especially suitable for masking purposes.

SUMMARY OF THE INVENTION

To this end the invention provides a masking film consisting of one or more layers for the use in selectively lacquering surface parts, in particular of cars, with a polar outer layer characterized in that the polar outer layer is made from a polymer of copolymer or terpolymer, which of itself remains permanently polar, without any pre- or post-treatment.

A big advantage of such a polar layer, in comparison with the corona-treated foil is, that the polarity of the layer is permanent, so that even after a long period of time such a foil can be used for masking surfaces without loss of its original polarity.

Moreover, it will be clear that a corona treatment using costly corona equipment may indeed be omitted.

The masking film can be composed of one or more layers, of which the outer layer obviously is the polar layer.

In the case where the masking film consists of only one layer, then obviously this layer is the polar layer.

It has been shown that a good polar outer layer can be achieved if it is prepared from an acidic copolymer or an acidic terpolymer.

Preferably the polar outer layer is an ionomeric layer obtained from the reaction product of an acidic copolymer or an acidic terpolymer and a metal salt.

Preferably the ionomeric outer layer is formed from the reaction product of ethylene acrylic acid or ethylene methacrylic acid on the one hand and a sodium or zinc compound on the other hand.

It should be noted that in addition to sodium and zinc compounds also other metal compounds, such as copper and iron compounds, may be used to obtain the desired ionomer.

The zinc ionomer is preferred above the sodium ionomer because the zinc ionomer possesses a higher polarity.

The ionomers mentioned are commercially available; for instance, the ionomer used in this invention is of the Surlyn 1650-E type, a trade name of Dupont de Nemours.

It should be noted that the effect of the polar layer not only extends to the strong adhesion of paint or lacquer, but it also enables the polar layer to attract and bind most of the solvents due to its high polarity. Part of the solvent is even absorbed through the polar layer.

The ionomer has the further advantage that it contributes to a high tensile strength, a good oil barrier and also a low tear strength. This latter fact is important when the foil is to be cut.

BRIEF DESCRIPTION OF THE DRAWING

The drawing is a schematic illustration of a preferred embodiment masking film of the invention.

DETAILED DESCRIPTION OF THE PREFERRED EMBODIMENTS OF THE INVENTION

According to a preferred embodiment the masking film according to the invention consists of three layers namely an inner layer, that is to say a layer adjacent to the surface part. This layer consists advantageously of MDPE (medium density polyethene) and has a layer thickness of about 3 mµ. The middle layer consists advantageously of LLDPE (linear low density polyethene) with a layer thickness of about 6 mµ, while the outer layer is a zinc ionomer with a layer thickness of about 3 mµ.

It will be clear that the polar outer layer is the layer onto which paint or lacquer is sprayed.

The invention will now be elucidated with reference to the drawing which illustrates a preferred embodiment of masking film according to the invention. The reference number 1 in the drawing refers to the masking film according to the invention, which foil is composed of three layers. The ionomeric layer 2 in this embodiment consists of a zinc ionomer and has a layer thickness of 3 mμ. However, the layer thickness may vary from 1 to 40 mμ and can also consist of other ionomers such as sodium, iron or copper ionomers, but also of acidic copolymers and acidic terpolymers. This layer is particularly suitable for binding a lacquer or paint layer applied thereto, as well as the solvent from it, so that there is no risk of flaking of paint or lacquer after removal of the masking film. Moreover, such an outer layer retains its polarity permanently.

The middle layer 3 consists of LLDPE (linear low density polyethene) having a layer thickness of about 6 mμ, which layer thickness in practice varies between 1–40 mμ.

The inner layer 4 of the masking film according to the invention consists of MDPE (medium density polyethene) having a layer thickness of 3 mμ, which layer thickness may however vary from 1–40 mμ.

The inner and middle layers do not contribute to the adhesion of the lacquering and may just as well be made from all kinds of other polymers without detracting from the effectiveness of the masking film. If during drying or hardening of the painted or lacquered surfaces high temperatures are uses, for example when applying I.R., then a polymer must be used with a softening point sufficiently high so that the foil is able to withstand the high temperatures of, for instance above 120° C., in a drying installation. In such cases one can advantageously use a masking film which is composed of three layers, namely a polypropylene inner layer, a LLDPE middle layer and a zinc ionomer outer layer.

It should be noted that the use of migrating additives such as, for instance lubricants should be limited, because such substances have a negative effect on the lacquer or paint on the surface of the foil.

It should be noted that the polar polymer may be applied in more than one layer, if, for instance the effect is desired on two sides or if no co-extrusion line is available.

It will be understood that the invention is not limited to the above-mentioned embodiments of the coating film.

I claim:

1. A masking film to use when lacquering surface parts, which consists of a multilayer foil having a polar outer layer consisting of a permanently polar ionomer resin acid copolymer or terpolymer free of any pre- or post treatment.

2. A masking film according to claim 1, wherein the ionomer outer layer is formed from the reaction product of an acidic copolymer or an acidic terpolymer and a metal salt.

3. A masking film according to claim 1, wherein the ionomer outer layer is formed from the reaction product of ethylene acrylic acid or ethylene methacrylic acid hand and a sodium or zinc salt.

4. A masking film according to claim 1, the foil consists of three layers, namely a medium density polyethylene inner layer, a linear low density polyethylene middle layer and a zinc ionomer outer layer.

5. A masking film according to claim 1, wherein the foil consists of three layers, namely a polypropylene inner layer, a linear low density polyethylene middle layer and a zinc ionomer outer layer.

* * * * *